United States Patent [19]
Yamamoto et al.

[11] Patent Number: 5,272,553
[45] Date of Patent: Dec. 21, 1993

[54] PROJECTION TYPE LIQUID CRYSTAL DISPLAY DEVICE WITH TWISTED NEMATIC LIQUID CRYSTAL LAYERS

[75] Inventors: Kunihiko Yamamoto; Yutaka Ishii, both of Nara, Japan

[73] Assignee: Sharp Kabushiki Kaisha, Osaka, Japan

[21] Appl. No.: 960,197

[22] Filed: Oct. 8, 1992

Related U.S. Application Data

[63] Continuation of Ser. No. 747,398, Aug. 16, 1991, abandoned, and Ser. No. 428,299, Oct. 27, 1989, abandoned.

[30] Foreign Application Priority Data

Oct. 28, 1988 [JP] Japan ................ 63-274095
Dec. 5, 1988 [JP] Japan ................ 63-307113

[51] Int. Cl.⁵ .............................. G02F 1/13
[52] U.S. Cl. .............................. 359/53; 359/41; 359/87; 359/54
[58] Field of Search .......... 350/335, 336, 337; 359/53, 41, 54, 55, 87

[56] References Cited

U.S. PATENT DOCUMENTS

| | | | |
|---|---|---|---|
| 4,335,936 | 6/1982 | Nonomura et al. | 350/335 |
| 4,375,317 | 3/1983 | Funada et al. | 350/335 |
| 4,659,182 | 4/1987 | Aizawa | 350/339 F |
| 4,838,655 | 6/1989 | Hunahata et al. | 359/53 |
| 4,842,379 | 6/1989 | Oishi et al. | 350/335 |
| 4,927,240 | 5/1990 | Stolov et al. | 350/335 |
| 4,935,757 | 6/1990 | Hatano et al. | 350/336 |
| 4,941,737 | 7/1990 | Kimura | 350/335 |
| 4,952,036 | 8/1990 | Gulick et al. | 350/335 |
| 4,962,997 | 10/1990 | Baldwin | 359/41 |

FOREIGN PATENT DOCUMENTS

| | | |
|---|---|---|
| 0284372 | 9/1988 | European Pat. Off. |
| 2844572 | 4/1979 | Fed. Rep. of Germany |
| 2561020 | 3/1985 | France |
| 56-70524 | 6/1981 | Japan ................ 350/335 |
| 56-122008 | 9/1981 | Japan ................ 350/335 |
| 57-76522 | 5/1982 | Japan ................ 350/335 |
| 60-191226 | 9/1985 | Japan ................ 350/335 |
| 2139795 | 12/1983 | United Kingdom ...... 359/55 |

OTHER PUBLICATIONS

Morozumi et al., *SID 86 Digest* (1989) pp. 375–378.

*Primary Examiner*—Jerome Jackson
*Assistant Examiner*—Courtney A. Bowers
*Attorney, Agent, or Firm*—Morrison & Foerster

[57] ABSTRACT

A projection type liquid crystal display device which displays an image on a screen by projecting the light emitted from a light source and passing through a liquid crystal display element onto said screen, said element having first and second liquid crystal panels, a plurality of signal electrodes which are parallel with each other; and scanning electrodes which are parallel with each other and are orthogonal to said signal electrodes, said signal electrodes and scanning electrodes being disposed for sandwiching each said liquid crystal layer therebetween and modulating the strength of light that has been transmitted through each portion of said liquid crystal layer, wherein the signal electrodes arranged in parallel on the first liquid display panel are separated into two parts at the middle of upper half display portion, and the signal electrodes arranged in parallel on the second display panel are separated into two parts at the middle of lower half display portion.

3 Claims, 8 Drawing Sheets

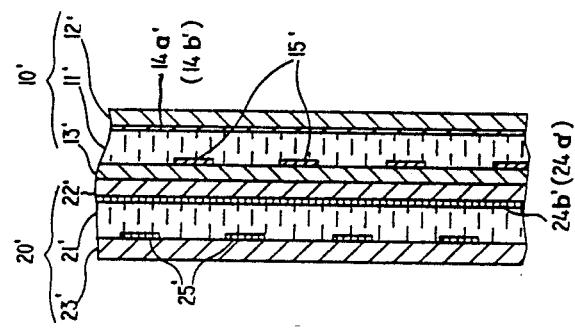
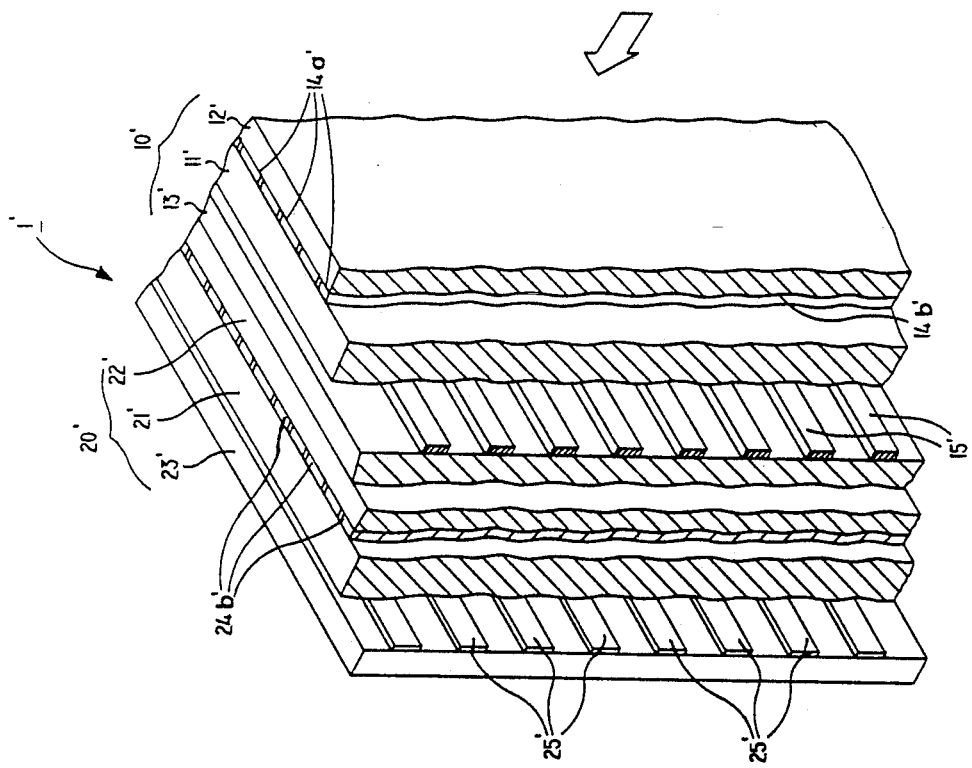
FIG. 4b
FIG. 4a

PROJECTION TYPE LIQUID CRYSTAL DISPLAY DEVICE WITH TWISTED NEMATIC LIQUID CRYSTAL LAYERS

This application is a continuation of application Ser. No. 747,398 and 428,299, filed Aug. 16, 1991 and Oct. 27, 1989, both abandoned.

BACKGROUND OF THE INVENTION

1. Field of the Invention:

The present invention relates to a liquid crystal display device for displaying a great deal of character information and various kinds of images. More particularly, it relates to a projection type liquid crystal display device having a plurality of twisted nematic type liquid crystal layers for displaying images by projecting light through each liquid crystal layer onto a screen.

2. Description of the prior art:

A projection type liquid crystal display device in which a plurality of twisted nematic type liquid crystal panels are used has been developed as a liquid crystal display device for displaying a great deal of character information and various kinds of images. FIG. 7 shows the structure of such a conventional projection type liquid crystal display device, which comprises a liquid crystal display element 6 composed of a pair of laminated liquid crystal panels 60 and 70. Light emitted from a light source 31 is made parallel by light converging lens 32 and projected onto the liquid crystal panel 60. The light penetrates through and is modulated into a given display pattern by the liquid crystal panel 60 and penetrates the other liquid crystal panel 70 to be projected onto a screen 35 by the projecting lens 34, so that a given image can be displayed on the screen 35.

In the liquid crystal panel 60 that is located on the side of the light source 31, a twisted nematic type liquid crystal layer 61 is sandwiched between a pair of substrates 62 and 63 as shown in FIG. 8. In the other liquid crystal panel 70 located on the side of the screen 35, a twisted nematic type liquid crystal layer 71 is likewise sandwiched between a pair of substrates 72 and 73. The liquid crystal layer 61 in the liquid crystal panel 60 on the side of the light source 31 is of STN (supertwisted nematic) type or SBE (Supertwisted Birefringence Effect) type, wherein the twist angles of the liquid crystal molecules are about 180 to 270 degrees. The liquid crystal molecules of the liquid crystal layer 71 in the other liquid crystal panel 70 on the side of the screen 35 is of STN type or SBE type, wherein the rotation direction of twist of the liquid crystal molecules is opposite to that of the liquid crystal molecules in the liquid crystal layer 61 of the liquid crystal panel 60 on the side of the light source 31.

The liquid crystal layer 61 of the liquid crystal panel 60 on the side of the light source 31 is operated by a multiplex drive, and one substrate 62 thereof is provided with a number of transparent scanning electrodes 64 which extend in a parallel manner in a given direction, as shown in FIG. 9. Each scanning electrode 64 is connected to a scanning-side drive circuit 66, and all the scanning electrodes 64 are driven by the scanning-side drive circuit 66. A number of signal electrodes 65 are arranged on the other substrate 63 which is disposed across the liquid crystal layer 61 from the substrate 62, so that the signal electrodes 65 can be arranged at right angles to each scanning electrode 64, resulting in a matrix electrode between the signal electrode 65 and the scanning electrodes 64 placed on the other substrate 62. Each signal electrode 65 is divided into two sections in the direction of arrangement of the scanning electrodes 64. A given voltage is selectively applied to each of the divided signal electrodes 65 by means of signal-side drive circuits 67a and 67b.

On the contrary, substrates 72 and 73 on the liquid crystal panel 70 arranged on the side of the screen 35 are not provided with such electrodes as shown in the above.

In such a liquid crystal display device, voltage is selectively applied to each scanning electrode 64 in the liquid crystal panel 60 on the side of the light source 31 in sequence by the scanning-side drive circuit 66. Voltage is also selectively applied to the signal electrodes 65 in accordance with the display patterns by the signal-side drive circuit 67a or 67b. The light is then modulated at the portions (pixels) of the liquid crystal layer 61 corresponding to the points of intersection of both the electrodes to which voltage is applied. The light penetrates through the liquid crystal panel 60 through to the liquid crystal panel 70 on the side of the screen 35. The liquid crystal panel 70 compensates the coloration of the light penetrating through the liquid crystal layer 61 of the liquid crystal panel 60 at the side of the light source 31, said coloration arising by the effect of birefringence of the liquid crystal layer 61.

Such a construction as mentioned above ensures that the scanning electrodes 64 allow scanning of four hundred lines, for instance, at a duty drive of 1/200.

In recent years, demand is for liquid crystal display devices that have pixels formed with a high density so as to increase the capacity of display.

In a conventional liquid crystal display device of the above-mentioned multiplex drive-type, in order to increase the density of pixels, when the number of the scanning electrodes is increased to thereby increase the multiplex amount (i.e., the number of time-sharing), sufficient voltage is not applied to the liquid crystal pixels and the contrast of images is lowered, or the response speed is lowered, so that the quality of the display is remarkably spoiled. Such a lowering of the contrast and a lowering of the response speed can be prevented if non-linear type elements such as diodes, etc., and switching elements such as thin film transistors, etc., are added to each liquid crystal pixel. However, the ratio of opening, which is the ratio of the area of pixels to the display surface of the liquid crystal layer, is lowered, and the economical efficiency is also lowered.

The signal electrodes and the scanning electrodes are usually formed on substrates by patterning a transparent conductive film such as ITO (indium oxide). Accordingly the electrodes on a substrate become crowded if the number of scanning electrodes is increased in order to increase the density of pixels, so that the patterning itself and/or the connection of the drive circuits to the electrodes becomes difficult.

Moreover, in a direct sight type liquid crystal display device in which a plurality of liquid crystal layers having voltage-applying means respectively, are laminated, there is a difference in sight between the display portions of the laminated liquid crystals. That is, this kind of display device lacks a continuity of the display portions, resulting in a lowering of the quality of display.

SUMMARY OF THE INVENTION

The projection type liquid crystal display device of this invention, which overcomes the above-discussed and numerous other disadvantages and deficiencies of the prior art, comprises a liquid crystal display element that has a plurality of liquid crystal panels laminated, each of which has a twisted nematic type liquid crystal layer and electrode lines that are disposed in a latticed manner on the liquid crystal layer, the electrode lines modulating light that has been transmitted through each pixel of the liquid crystal layer, wherein the rotation direction of twist of the liquid crystal molecules of the liquid crystal layer in a first liquid crystal panel is opposite to that of the twist of the liquid crystal molecules of the liquid crystal layer in a second liquid crystal panel that is adjacent to the first liquid crystal panel; the orientation of the liquid crystal molecules of a portion of the liquid crystal layer in the first panel in the vicinity of the liquid crystal layer in the second panel is orthogonal to that of a portion of the liquid crystal layer in the second panel in the vicinity of the liquid crystal layer in the first panel; and the electrode lines that are placed in a parallel manner in the first panel are not superimposed in the direction of light transmission on the electrode lines that are placed in a parallel manner in the second panel.

In a preferred embodiment, the electrode lines that are disposed so as not to be superimposed are closely arranged only in a given area in each panel.

In a preferred embodiment, each of the electrode lines in the first liquid crystal panel is positioned to face a portion respective to the adjacent electrode lines of the second liquid crystal panel.

In a preferred embodiment, the device is provided with only one liquid crystal display element by which images are monochromatically displayed.

In a preferred embodiment, the device is provided with three liquid crystal display elements by which images are displayed in color.

Thus, the invention described herein makes possible the objectives of (1) providing a projection type liquid crystal display device in which electrode lines of a plurality of liquid crystal panels in the liquid crystal display elements are disposed so that they do not overlap in the direction of light transmission, so that the display capacity can be increased without increasing the amount of time-sharing and a display of high resolution and excellent contrast can be achieved; and (2) providing a projection type liquid crystal display device in which the formation of the electrodes of electrode lines and the connection of the electrode lines to the corresponding drive circuits can be easily performed, thereby causing the productivity to be remarkably increased.

BRIEF DESCRIPTION OF THE DRAWINGS

This invention may be better understood and its numerous objects and advantages will become apparent to those skilled in the art by reference to the accompanying drawings as follows:

FIGS. 4a and 4b, respectively, are a perspective view and a cross sectional view showing a part of the liquid crystal display element in another projection type liquid crystal display device of this invention.

DESCRIPTION OF THE PREFERRED EMBODIMENTS

EXAMPLE 1

Figure 2:
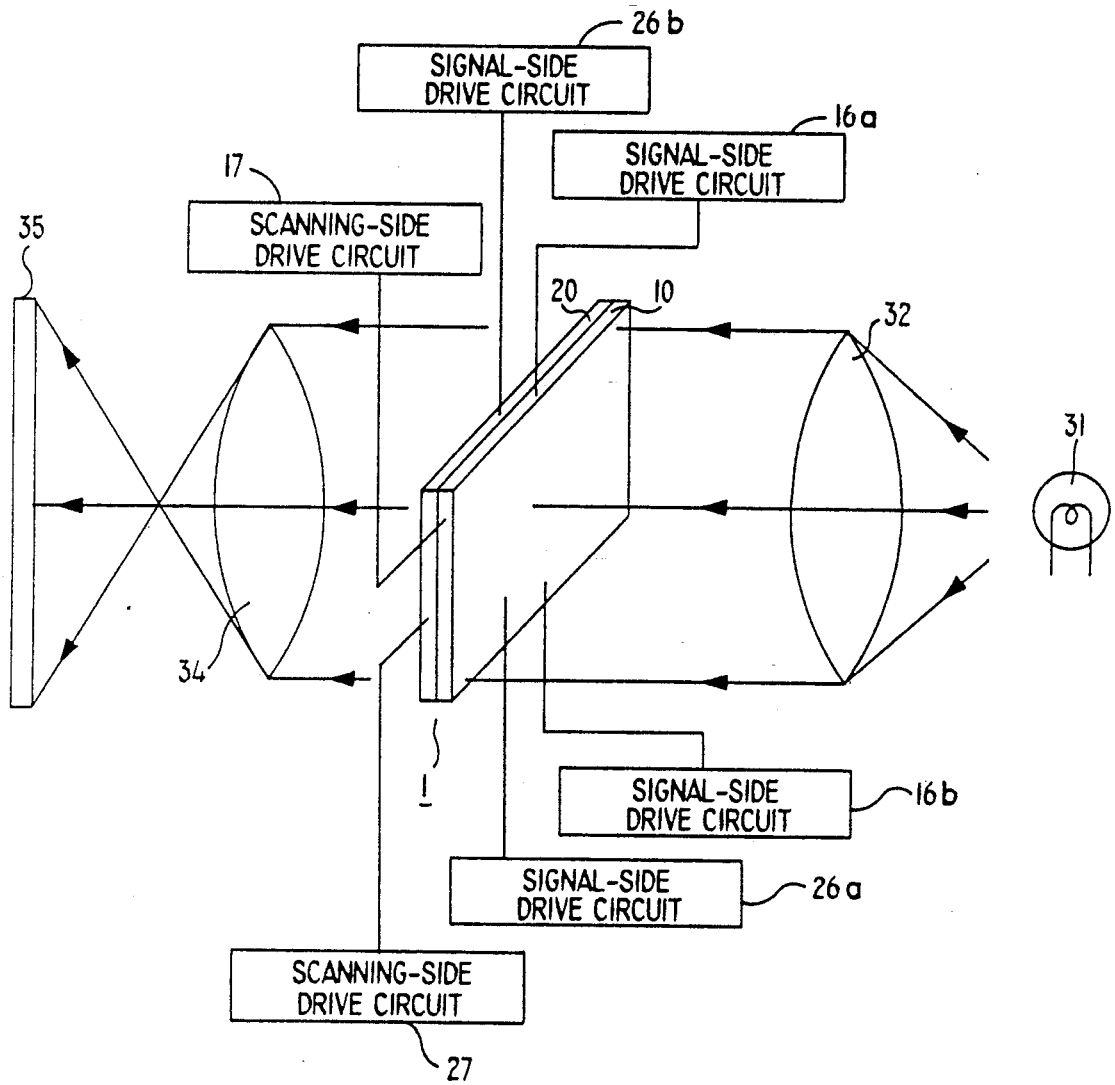
FIG. 2 is a schematic diagram showing the projection type liquid crystal device of FIG. 1.

FIG. 2 shows a liquid crystal display device of this invention, which has a liquid crystal display element 1 composed of a laminate of a pair of liquid crystal panels 10 and 20, wherein the panels 10 and 20 have respective liquid crystal molecules which are perpendicular to one another. Light coming from a light source 31 is made parallel by a light converging lens 32 and is projected on the liquid crystal display element 1. The light penetrates through the liquid crystal display element 1 and is projected on a screen 35 by means of a light projecting lens 34.

Figure 1:
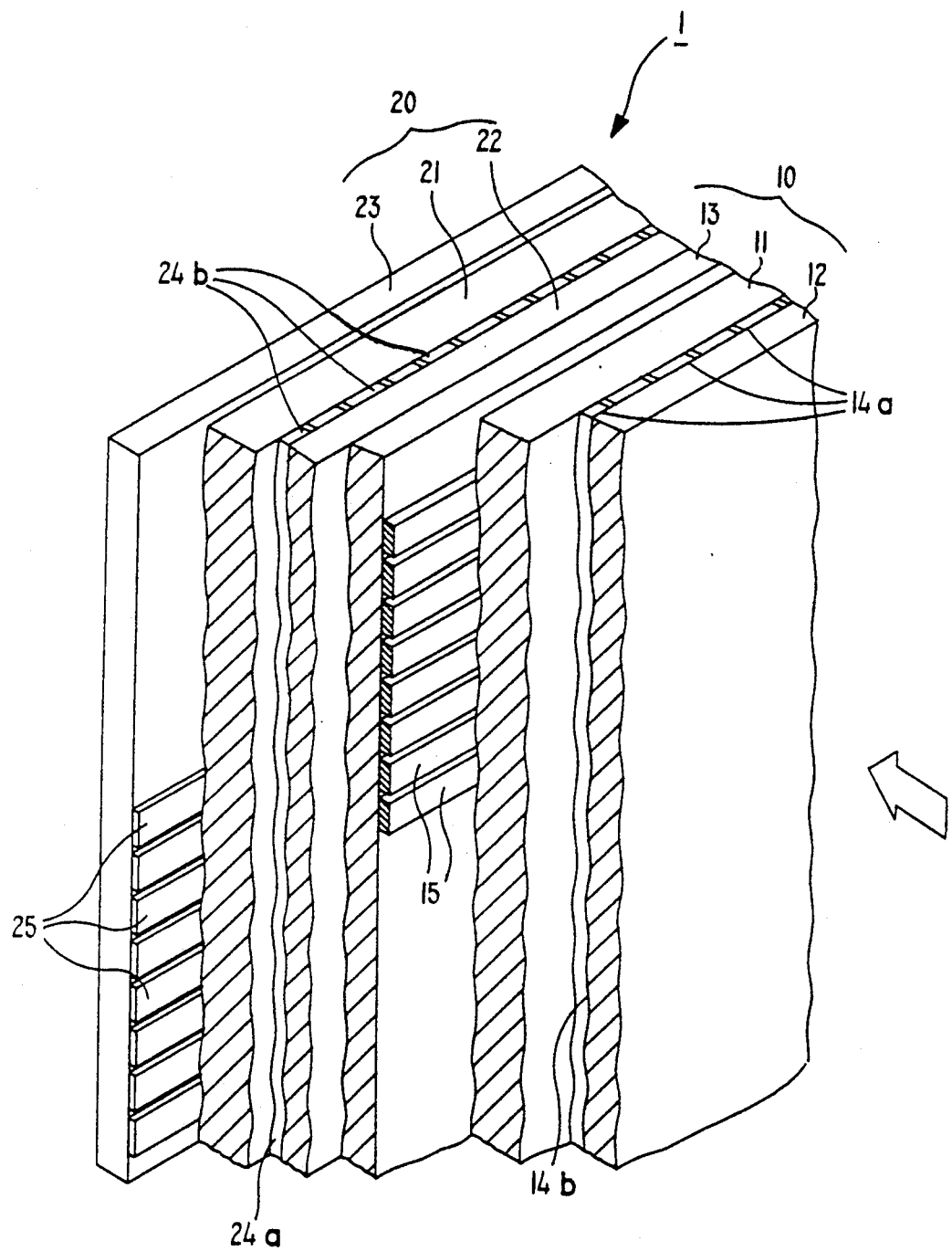
FIG. 1 is a perspective view showing a part of the liquid crystal display element of a projection type liquid crystal display device of this invention.

As shown in FIG. 1, the liquid crystal display element 1 is provided with a liquid crystal panel 10 having liquid crystal molecules perpendicularly arranged on the side of the light source 31 and another liquid crystal panel 20 perpendicularly arranged on the side of the screen 35. The liquid crystal panel 10 on the side of the light source 31 has a twisted nematic type liquid crystal layer 11 which is placed between a pair of transparent substrates 12 and 13. The liquid crystal panel 20 on the side of the screen 35 is also composed so that a twisted nematic type liquid crystal layer 21 is placed between a pair of transparent substrates 22 and 23.

The liquid crystal layer 11 of the liquid crystal panel 10 on the side of the light source 31 is of STN type or SBE type in which the angles of twist of the liquid crystal molecules thereof are about 180 to 270 degrees. The liquid crystal layer 21 of the liquid crystal panel 20 on the side of the screen 35 is of STN type or SBE type as well, in which the rotation direction of twist of the liquid crystal molecules thereof is opposite to the rotational direction of twist of the liquid crystal layer 11 of the liquid crystal panel 10 on the side of the light source 31. The orientation of the liquid crystal molecules of a portion of the liquid crystal layer 11 that is in the vicinity of the liquid crystal layer 21 is set to be intersected at right angles to that of the liquid crystal molecules of a portion of the liquid crystal layer 21 that is in the vicinity of the liquid crystal layer 11. Therefore, the coloration arising by the birefringence effect of light which is transmitted through the liquid crystal layers 11 and 21 of the respective liquid crystal panels 10 and 20 is optically compensated by the liquid crystal layer of the other liquid crystal panel.

Figure 3B:
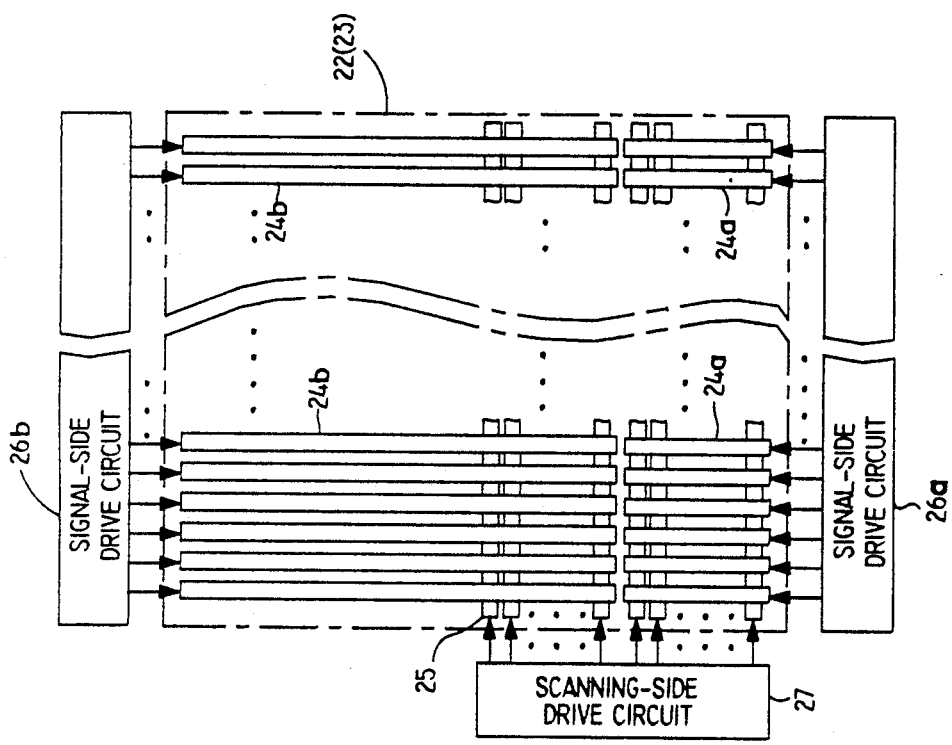
FIGS. 3a and 3b, respectively, are schematic diagrams showing the arrangement of the electrode lines of a liquid crystal panel in each of the liquid crystal display elements of FIG. 1.
Figure 3A:
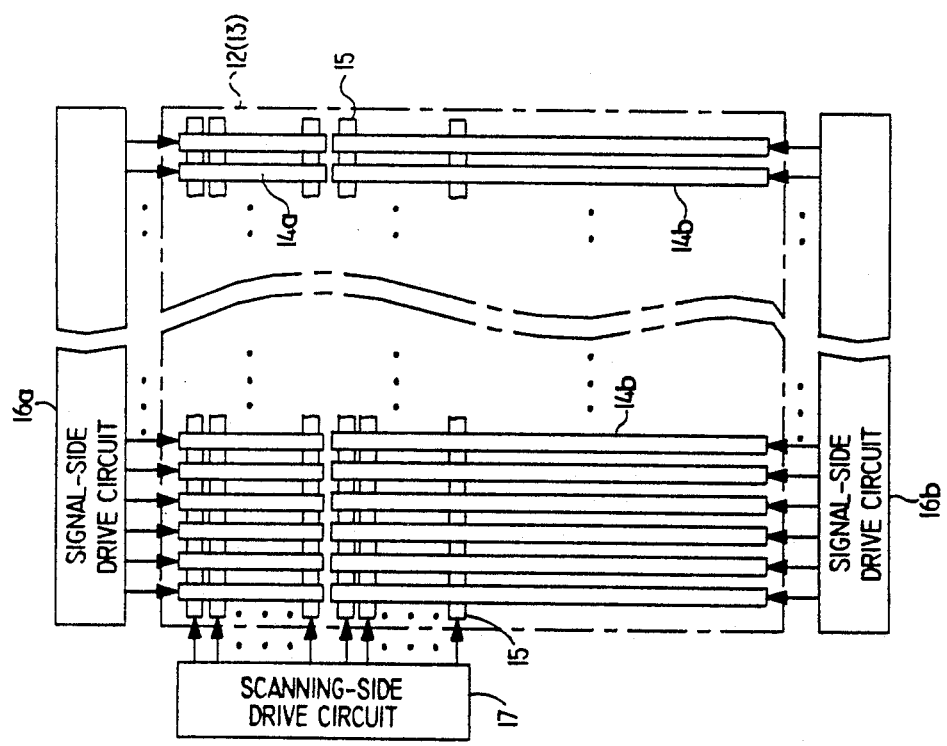

As shown in FIG. 3a, a number of transparent straight signal electrode lines 14a, 14a, ... and 14b, 14b, ... are disposed on the substrate 12 upon which light is incident in the liquid crystal panel 10 at the side of the light source 31. The respective signal electrode lines 14a are disposed to be perpendicular with a parallel member in the upper area at the side of the liquid crystal layer 11 of the perpendicular substrate 12, and the other signal electrode lines 14b are disposed to be roughly perpendicular in a parallel manner in the central area an in the lower area, excluding the upper area, on the substrate 12, so that the electrode lines 14b become aligned with the signal electrode lines 14a, respectively. Voltage is selectively applied by means of a signal-side drive circuit 16a to each of the signal electrode lines 14a in the upper area of the substrate 12 in accordance with a given display, and voltage is also selectively applied to each of the other signal electrode lines 14b by means of a signal-side drive circuit 16b in accordance with a given display.

A number of transparent, straight scanning electrode lines 15, 15, ... are disposed in a parallel manner in the upper half area at the side of the liquid crystal layer 11 of the substrate 13 that is placed across the liquid crystal layer 11 from the substrate 12 on which the signal electrode lines 14a and 14b are disposed, so that they can be intersected with the signal electrode lines 14a and 14b at right angles to each other. No scanning electrode lines are provided in the lower half area of the substrate 13. Voltage is selectively applied in sequence to the scanning electrode lines 15 by means of a scanning-side drive circuit 17. Voltage is applied to the portions (pixels) of the liquid crystal layer 11 facing the intersections of given portions of the scanning electrode line 15, to which voltage has been applied in the substrate 13, with given portions of the signal electrode lines 14a or 14b to which voltage has been applied in the substrate 12. Thus, the light that is transmitted to the said portions (pixels) of the liquid crystal layer 11 is modulated.

On the other hand, as shown in FIG. 3b, a number of transparent, straight signal electrode lines 24a, 24a, ... and 24b, 24b, ... are disposed on the substrate 22 provided on the side of the liquid crystal panel 10 of the liquid crystal panel 20, on the side of the screen 35, on which the liquid crystal panel 10 is laminated as shown in FIG. 3b. Each of the signal electrode lines 24a is disposed to be roughly perpendicular in a parallel manner in the lower area of the perpendicular substrate 12, and each of the signal electrode lines 24b is disposed to be roughly perpendicular in a parallel manner in the upper area and in the central area, excluding the lower area of the substrate 22, so that the signal electrode lines 24b become aligned with the signal electrode lines 24a. Voltage is selectively applied to the signal electrode lines 24a placed in the lower area of the substrate 22 by means of a signal-side drive circuit 26a in accordance with a given display. Voltage is also selectively applied to the signal electrode lines 24b by means of a signal-side drive circuit 26b in accordance with a given display.

A number of transparent, straight scanning electrode lines 25, 25, ... which are intercrossed with the signal electrode lines 24a and 25b at right angles to each other are to be disposed in a parallel manner in the lower half area on the side of the liquid crystal layer 21 of the substrate 23 placed across the liquid crystal layer 21 from the substrate 22 on which the signal electrode lines 24a and 24b are disposed. None of such scanning electrode lines is disposed in the upper half area of the substrate 23. Voltage is applied to the portions (pixels) of the liquid crystal layer 21 corresponding to the intersections of given portions of the scanning electrode lines 25 in the substrate 23 and to a given portion of the signal electrode lines 24a or 24b in the substrate 22, so that the light transmitted to the said intersection is modulated.

As mentioned above, the scanning electrode lines are not disposed in the portion of the liquid crystal panel 20 on the side of the screen 35 that faces the portion (the upper half area) at which the scanning electrode lines 15 are disposed. Nor in the liquid crystal panel 10 that faces the portion (the lower half area) at which the scanning electrode lines 25 are disposed in the liquid crystal panel 20. Therefore, the pixel portions to which voltage is applied in the liquid crystal layers 11 and 21 of the respective liquid crystal panels 10 and 20 do not overlap each other in the direction of light transmission.

In the above-mentioned liquid crystal display device according to this invention, voltage is applied to predetermined pixel portions in the respective liquid crystal layers 11 and 21 at each of the liquid crystal panels 10 and 20 of the liquid crystal display element 1 by means of the scanning electrode lines 15 and 25 and the signal electrode lines 14a, 14b, 24a, and 24b, so that the light transmitted to the said pixel portions is modulated. Light from the light source 31 is made parallel and projected on the liquid crystal display element 1 by the light converging lens 32, and the light transmitted to the given pixel portions in the liquid crystal layers 11 and 21 of the respective liquid crystal panels 10 and 20 is enlarged and projected onto, the screen 35 by the projecting lens 34, resulting in a given image on the screen 35.

At this time, the pixel portions to which voltage of the liquid crystal layers 11 and 21 in each of the liquid crystal panels 10 and 20 is applied, do not overlap each other in the direction of light transmission, and accordingly the non-pixel portions of the liquid crystal layer 11 or 21 take a role to compensate the phase of light of the pixel portions of the other liquid crystal layer 21 or 11. For this reason, the coloration of the transmitted light arising by the birefringence effect which is produced in the pixel area in the upper half area of the liquid crystal layer 11 on the side of the light source 31 is optically compensated in the non-pixel area of the upper half area of the liquid crystal layer 21 on the side of the screen 35. In the same way, the transmitted light whose coloration based on the birefringence effect in the non-pixel area of the lower half area in the liquid crystal layer 11 on the side of the light source 31 has been optically compensated is transmitted to the pixel area in the lower half area of the liquid crystal layer 21 on the side of the screen 35, whereby an image, whose contrast ratio is high, is projected under magnification onto the screen 35.

At this time, the focus of the light converging lens 32 must be set at a point between the liquid crystal panels 10 and 20, and moreover, each of the substrates 13 and 23 must be made as much thinner as possible so that the display of each of the liquid crystal layers cannot be observed to be indistinct with the eye. The thickness of each of the substrates is determined depending upon the focal distance and/or the aperture of the said lens. According to a display experiment of this invention, when a light converging lens with the F number of 3.5, the focal distance of which is 150 mm (i.e., f=150 mm), was used, a glass substrate of a thickness of 0.5 mm or less enabled to form a distinct, clear image. When the thicknesses of the substrates 13 and 23 is required to make thinner, these substrates 13 and 23 are formed into a single glass substrate and the signal electrodes and the scanning electrodes are then disposed, respectively, on both sides thereof. Instead of such a glass substrate, a film substrate that is made of polyester resins can be employed.

The signal electrode lines 14a, 14b, 24a and 24b and the scanning electrode lines 15 and 25 are disposed into a matrix in the liquid crystal panels 10 and 20 of the liquid crystal display element 1, respectively. The signal electrode lines 14a and 14b and the scanning electrode lines 15 of the liquid crystal panel 10 are driven by the signal-side drive circuits 16a and 16b and the scanning-side drive circuit 17, respectively, so that they have a driving system independently of the signal electrode lines 24a and 24b and the scanning electrode line 25 which are driven by the signal-side drive circuit 26a and 26b and the scanning-side drive circuit 27, respectively, in the liquid crystal panel 20. In this way, by providing two independent systems, the scanning electrode lines 15 and 25, in a pair of liquid crystal panels 10 and 20, the multiplex number can be doubled without increasing the number of the scanning electrode lines, which makes it possible to provide a thousand lines of the scanning if the liquid crystal panels 10 and 20 are driven at a duty ratio of 1/250. As a result, sufficient voltage can be applied to the liquid crystal pixels, and it is possible to heighten the density of pixels without lowering image contrast and delaying the response.

Voltage is applied by means of the scanning-side drive circuits 17 and 27, respectively, to the scanning electrodes 15 and 25 disposed in the half area of each of the corresponding substrates 13 and 23 of the liquid crystal panels 10 and 20. Therefore, it is possible to increase the display capacity without increasing the tonal number of the scanning lines 15 and 25 in the liquid crystal panels 10 and 20 more than the total number of the scanning lines in a conventional liquid crystal display element and, without lowering the response speed. Moreover, a display of images with excellent contrast can be attained.

Although the above-mentioned embodiment only discloses a liquid crystal display element that is composed of a two-layered display panel, this invention can be, of course, applicable to a liquid crystal display element that is constituted by laminating of more than two sets, a pair of liquid crystal panels in which portions where voltage-applying means are disposed, respectively, are optically compensated by the liquid crystal layers. In this case, since the voltage-applying means do not overlap each other in the direction of light transmission, as well, it is possible to increase the displaying capacity in accordance with the number of sets of the liquid crystal panels without increasing the number of the scanning electrode lines. The above-mentioned configuration can be applied not only to scanning electrode lines but also to signal electrode lines, as well as to an active matrix type liquid crystal display device.

EXAMPLE 2

FIGS. 4a, 4b, 5a and 5b show another liquid crystal display device of this invention, in which a number of transparent, straight signal electrode lines 14a', 14a', . . . and 14b', 14b', . . . are disposed in the same manner as that in Example 1 on the surface on the side of the liquid crystal layer 11' of the substrate 12' upon which light is incident in the liquid crystal panel 10' on the side of the light source. The signal electrode lines 14a', respectively, are disposed to be perpendicular in a parallel manner in the upper area on the side of the liquid crystal layer 11' of a perpendicular substrate 12', and the signal electrode lines 14b', respectively, are disposed to be roughly perpendicular in a parallel manner in the lower area of the substrate 12' so that the signal electrode lines 14b' become aligned with the above signal electrode lines 14a', respectively. Voltage is selectively applied to each of the signal electrode lines 14a' placed in the upper area of the substrate 12' by a signal-side drive circuit 16a' in accordance with a given display. Voltage is also selectively applied to each of the signal electrode lines 14b' by a signal-side drive circuit 16b' in accordance with a given display.

A number of transparent, straight scanning electrode lines 15', 15', . . . are disposed in a parallel manner with an appropriate distance therebetween on the entire surface on the side of the liquid crystal layer 11' of the substrate 13' placed across the liquid crystal layer 11' from the substrate 12' on which the signal electrode lines 14a' and 14b' are disposed, so that the scanning electrode lines 15', 15', . . . can intersect the signal electrode lines 14a' and 14b' at right angles, resulting in a lattice. The scanning electrode lines 15', 15', . . . form a matrix electrode together with the signal electrode lines 14a' and 14b', and the distance between the adjacent scanning electrode lines 15', 15', . . . is set so that the distance therebetween becomes slightly larger than the width of each of the scanning electrode lines 15', 15', . . .

Voltage is selectively applied to the scanning electrode lines 15' in sequence by a scanning-side drive circuit 17'. Subsequently, voltage is applied to the portions (pixels) of the liquid crystal layer 11' corresponding to the intersections of given portions of the signal electrode lines 14a' or 14b' to which voltage is applied in the substrate 12' and given portions of the scanning electrode lines 15' to which voltage is applied in the substrate 13', so that the light transmitted to the intersection is modulated.

Figure 5B:
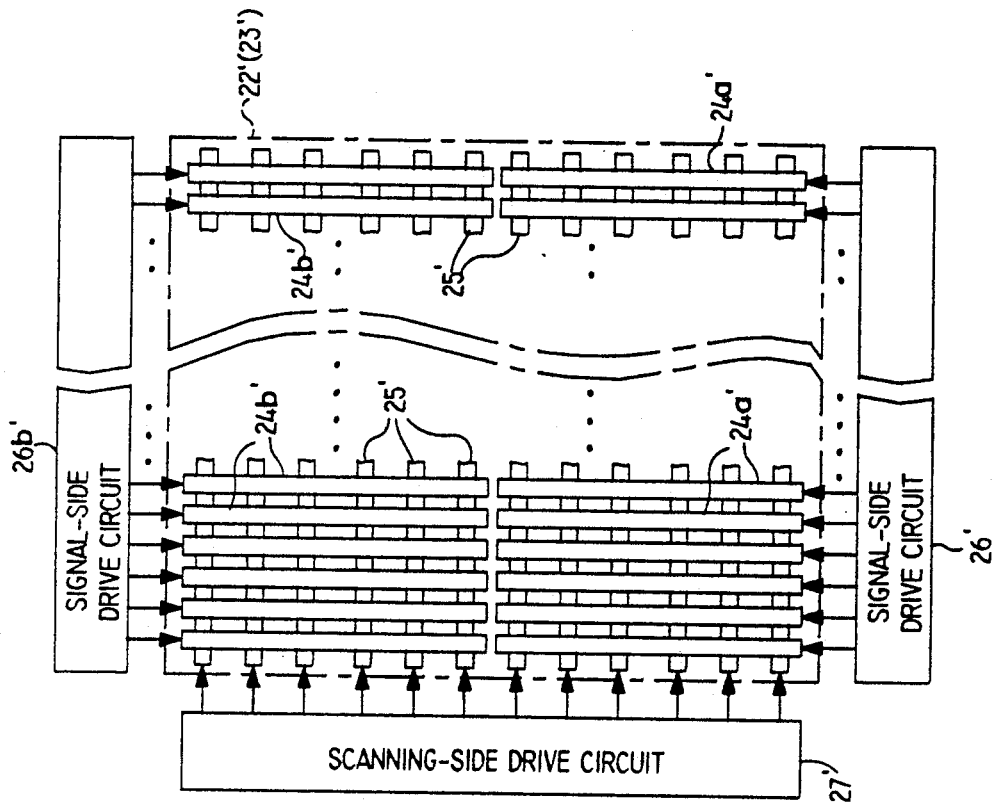
FIGS. 5a and 5b, respectively, are schematic diagrams showing the arrangement of the electrode lines of a liquid crystal panel in each of the liquid crystal display elements of FIGS. 4a and 4b.
Figure 5A:
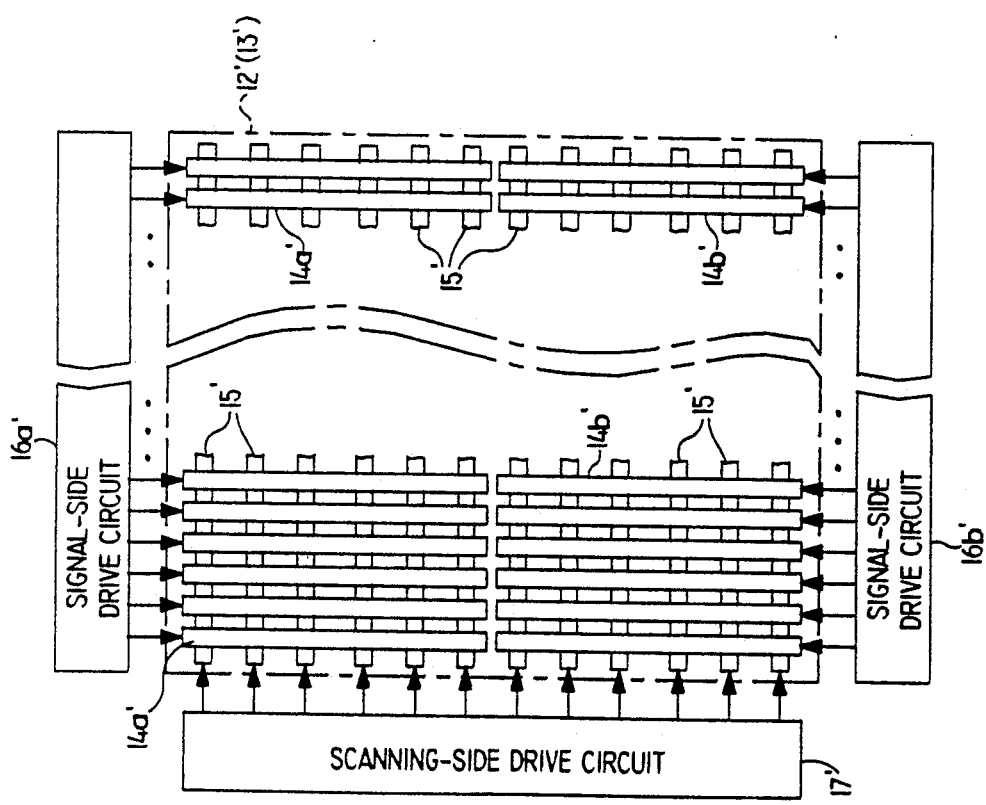

On the other hand, as shown in FIG. 5b, a number of transparent, straight signal electrode lines 24a', 24a', . . . and 24b', 24b', . . . are disposed on the surface on the side of the liquid crystal layer 21' of the substrate 22' that is placed on the side of the liquid crystal panel 10' in the liquid crystal panel 20' at the side of the screen that is laminated together with the liquid crystal panel 10'. The signal electrode lines 24a' are disposed to be roughly perpendicular in a parallel manner in the lower area of the perpendicular substrate 12', and the signal electrode lines 24b' are disposed to be roughly perpendicular in a parallel manner in the upper area of the substrate 22' so that the signal electrode lines 24b' become aligned with the corresponding signal electrode lines 24a'. Voltage is selectively applied by a signal-side drive circuit 26a' to each of the signal electrode lines 24a' arranged in the lower area of the substrate 22' in accordance with a given display. Voltage is selectively applied by a signal-side drive circuit 26b' to each of the signal electrode lines 24b' of the substrate 22' in accordance with a given display.

On the entire surface on the side of the liquid crystal layer 21' of the substrate 23' placed across the liquid crystal layer 21' from the substrate 22' on which such signal electrode lines 24a' and 24b' are arranged, a number of transparent, straight scanning electrode lines 25', 25', . . . are arranged in a parallel manner with an appropriate distance therebetween so that these scanning electrode lines 25', 25', . . . can intersect the signal electrode lines 24a' and 24b' to form a lattice. The scanning electrode lines 25', 25', . . . form a matrix electrode together with the signal electrode lines 24a' and 24b' disposed on the substrate 22' that is placed across the liquid crystal layer 21' from the substrate 23'. Furthermore, as shown in FIG. 4b, each of the scanning electrode lines 25', 25', . . . is positioned corresponding to the portion between the adjacent scanning electrode lines 15', 15', . . . arranged on the substrate 13' of the liquid crystal panel 10' on the side of the light source, so that the scanning electrode lines 25', 25', . . . are not superposed on these scanning electrode lines 15', 15', . . . Voltage is applied to each of the scanning electrode lines 25' in sequence by the scanning-side drive circuit 27', and in cooperation with the given signal electrode lines 24a' or 24b' to which voltage is applied, voltage is applied to the portions (pixels) of the liquid crystal layer 21' corresponding to the intersections of the lines 25' and the lines 24a' or 24b', so that the light transmitted through the said portions is modulated.

Any scanning electrode line is not disposed at a portion of the liquid crystal panel 20' that faces a portion on which the scanning electrode line 15' are disposed in the liquid crystal panel 10' on the side of the light source, and any scanning electrode line is not disposed at a portion of the liquid crystal panel 10' that faces a portion on which the scanning electrode lines 25' are disposed in the liquid crystal panel 20'. Therefore, the pixel portions to which voltage is applied in the liquid crystal layers 11' and 21' of each of the liquid crystal panels 10' and 20' do not overlap each other in the direction of light transmission.

The operation of the above-mentioned liquid crystal display device is the same as that of the liquid crystal display device in Example 1.

As mentioned above, since the pixel portions of the liquid crystal layer 11' and 21' to which voltage is applied in the liquid crystal panels 10' and 20' do not overlap each other in the direction of light transmission, the non-pixel portions of the liquid crystal layer 11' or 21' have a role for compensating the phase of light at the pixel portions of the other liquid crystal layer 21' or 11'. The coloration of the transmitted light arising by the birefringence effect produced in the pixel areas at the portion on which the scanning electrode lines 15' are disposed in the liquid crystal layer 11' on the side of the light source is optically compensated by the non-pixel areas of the portions on which the scanning electrode lines 25' are not arranged at the liquid crystal layer 21' in the side of the screen. In the same way, the transmitted light whose coloring is optically compensated by the birefringence effect in the non-pixel areas of the portions on which the scanning electrode lines 15' are not disposed in the liquid crystal layer 11' is transmitted through the pixel areas of the portions where the scanning electrode lines 25' are disposed in the liquid crystal layer 21' on the side of the screen. As a result, the heightening of the pixel density is attained and the lowering of image contrast is prevented. Moreover, high quality images having a high resolving power and a high contrast ratio are projected onto the screen under magnification.

Also, since the straight scanning electrode lines 15' and 25' are arranged in a parallel manner so that they do not overlap in the liquid crystal panels 10' and 20' as mentioned above, the distance interval between the adjacent scanning electrode lines 15' and the distance between the adjacent scanning electrode lines 25' can be set to be sufficiently large on the liquid crystal panels 10' and 20', respectively. Although the pixel density is heightened by increasing the number of scanning electrode lines, it is easy to form the electrode lines, and furthermore, it is easy to connect the drive circuits to the electrode lines.

Although the above-mentioned example only discloses that the scanning electrode lines in each liquid crystal panel are arranged with a distance therebetween corresponding to the width of each scanning electrode line in the direction of arrangement, this invention is, of course, applicable to a liquid crystal device in which a pair of scanning electrode lines arranged without any distance therebetween in each liquid crystal panel and each of the said pairs of the scanning electrode lines is arranged with a set distance from the adjacent pair of scanning electrode lines, said distance corresponding to the width of the pair of scanning electrode lines. Each pair of scanning electrode lines in one liquid crystal panel is positioned corresponding to the portion between the adjacent pairs of scanning electrode lines in the other liquid crystal panel that is laminated on the one liquid crystal panel.

Although the above-mentioned liquid crystal display element is composed of a double layered display panel, this invention is applicable to a lamination of three or more liquid crystal panels, each of which is provided with signal electrode lines of a matrix structure and scanning electrode lines of a matrix structure. These panels are laminated so that the scanning electrode lines do not overlap in the direction of light transmission. In this case, each liquid crystal panel is independently provided with scanning electrode lines and the pixel portions do not overlap each other in the direction of light transmission, and accordingly, it is possible to increase the display capacity with an increase in the number of sets of the liquid crystal panels, without increasing the number of the scanning electrode lines. The scanning electrode lines in each liquid crystal panel are arranged, for example, with a set distance that is two or more times the width of one scanning electrode line between the adjacent scanning electrode lines when the liquid crystal display element is composed of a three-layered liquid crystal panel, so that the scanning electrode lines in each liquid crystal panel cannot be superposed in the direction of light transmission.

EXAMPLE 3

Figure 6:
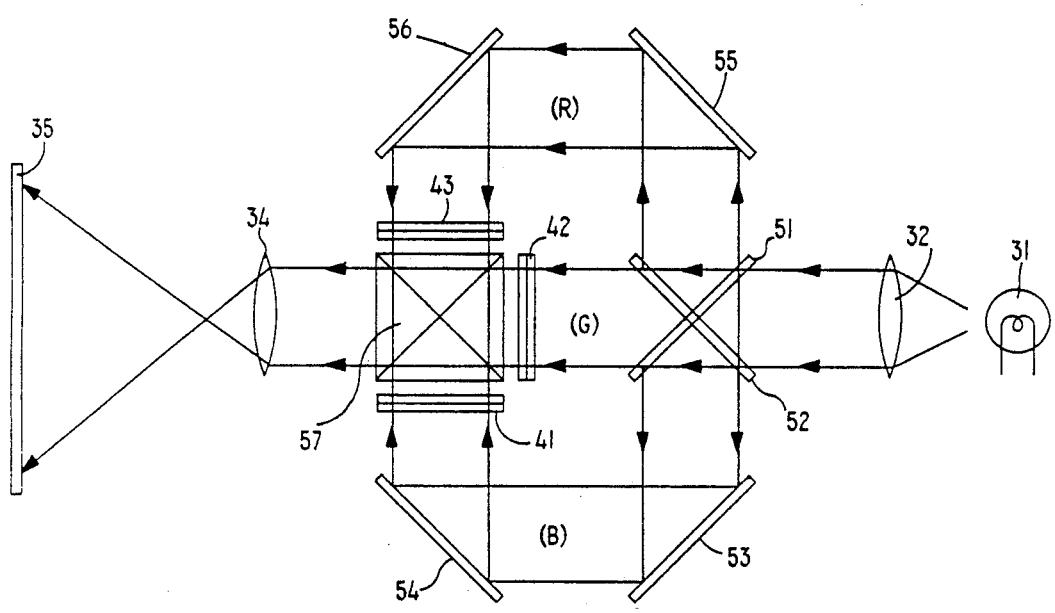
FIG. 6 is a schematic diagram showing another liquid crystal display device that attains a color display.
Figure 7:
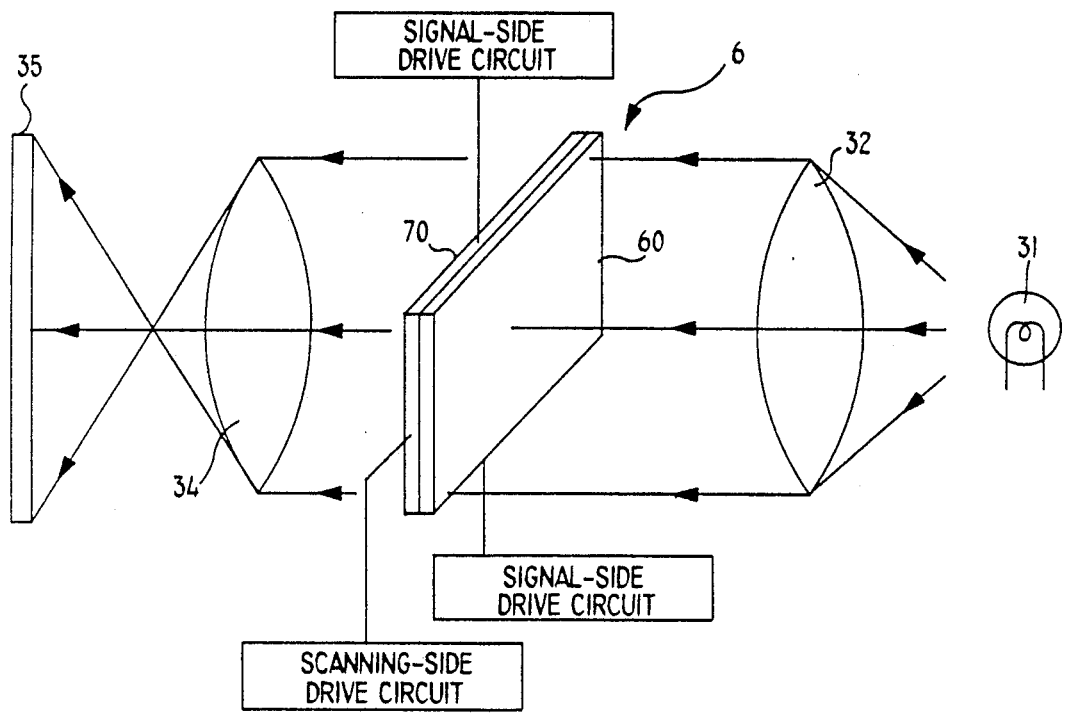
FIG. 7 is a schematic diagram showing a conventional projection type liquid crystal display device.
Figure 8:
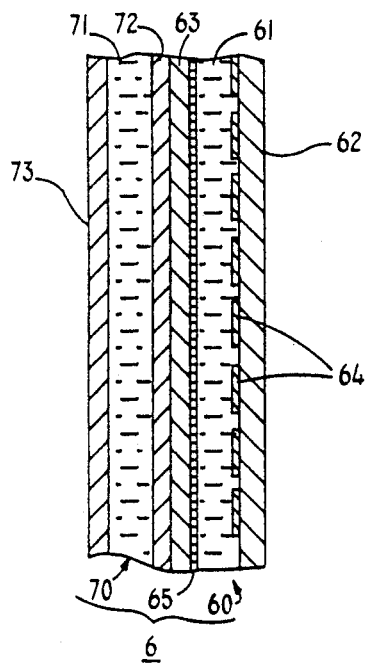
FIG. 8 is a cross sectional view showing the liquid crystal display element in the display device of FIG. 7.
Figure 9:
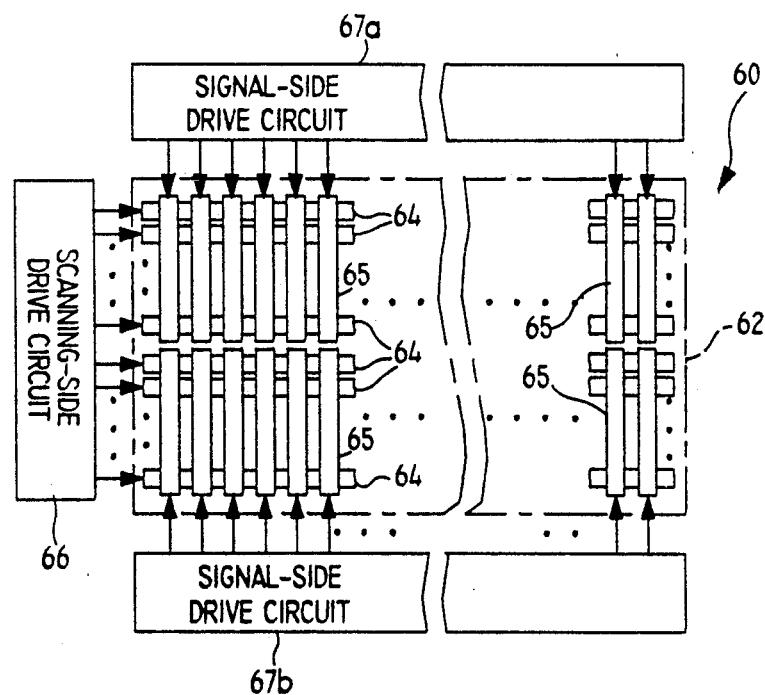
FIG. 9 is a schematic diagram showing the arrangement of electrodes of the liquid crystal panel in the display device of FIG. 7.

The invention is applicable to a liquid crystal display device for attaining a color display. As shown in FIG. 6, light from a light source 31 is made parallel by a light converging lens 32 and incident upon a blue-light reflection type dichroic mirror 51 and a red-light reflection type dichroic mirror 52, so that the light is decomposed into three colored lights, a blue light (B), a red light (R) and a green light (G). Green light (G), which is transmitted through both the mirrors 51 and 52, is incident upon a dichroic prism 57 through a liquid crystal display element 42, and blue light (B), which is reflected by the dichroic mirror 51 at right angles to the mirror 51, is directed by reflection mirrors 53 and 54 to a dichroic prism 57 through a liquid crystal display element 41. Red light (R), which is reflected by the dichroic mirror 52 at right angles to the mirror 51, is directed by reflection mirrors 55 and 56 to the dichroic prism 57 through a liquid crystal display element 43.

The liquid crystal display elements 41, 42 and 43 have the same configuration as that of the liquid crystal display element 1 of Example 1 and that of the liquid crystal display element 1' of Example 2 and have the same function as those of the elements 1 and 1'. The colored light rays, which have been incident upon the dichroic prism 57 through the respective liquid crystal display elements 41 through 43 are synthesized by the dichroic prism 57 and are projected onto the screen 35 resulting in a desired colored image on the screen 35.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A projection type liquid crystal display device which displays an image on a screen by projecting the light emitted from a light source and passing through a liquid crystal display element onto said screen, said element having first and second liquid crystal panels, each of which has a twisted nematic type liquid crystal layer or supertwisted nematic type liquid crystal layer in which the angles of twist of the liquid crystal molecules are about 180 to 270 degrees, and said device comprising:
   a plurality of signal electrodes which are parallel with each other; and
   scanning electrodes which are parallel with each other and are orthogonal to said signal electrodes, said signal electrodes and scanning electrodes being disposed for sandwiching each said liquid crystal layer therebetween and modulating the strength of light that has been transmitted through each portion of said liquid crystal layer where each of the scanning electrodes overlaps with each of the signal electrodes, wherein the rotation direction of twist of the liquid crystal molecules of the liquid crystal layer in the first liquid crystal panel is opposite to the rotation direction of twist of the liquid crystal molecules of the liquid crystal layer in the second liquid crystal panel;
   wherein the orientation of the liquid crystal molecules of a portion of the liquid crystal layer in the first panel in the vicinity of the liquid crystal layer in the second panel is orthogonal to that of a portion of the liquid crystal layer in the second panel in the vicinity of the liquid crystal layer in the first panel;
   and wherein said scanning electrodes on said first liquid crystal display panel are concentrated in half section of the first panel, and the scanning electrodes on said second liquid crystal panel are concentrated in a half section of the second crystal panel, said half section of the first crystal panel and half section of the second crystal panel being positioned in such a manner that they do not overlap with each other and wherein the signal electrodes arranged in parallel on the first liquid display panel are separated into two parts at the middle of upper half display portion, and the signal electrodes arranged in parallel on the second display panel are separated into two parts at the middle of lower half display portion; and wherein the focus of the light converging are set at a point between the first and second display panels.

2. A projection type liquid crystal display device according to claim 1, wherein images are monochromatically displayed on the screen by light which passes through one liquid crystal display element in which a plurality of liquid crystal panels are layered.

3. A projection type liquid crystal display device which displays an image on a screen by projecting the light emitted from a light source and passing through a liquid crystal display element onto said screen comprising:
   means for dividing light emitted from said light source into three light beams each corresponding to one of three primary colors;
   three liquid crystal display elements which respectively receive said three light beams so as to transmit at least part of and intercept the respective light beams; and
   means for synthesizing said three light beams respectively transmitted through said three liquid crystal display elements, so as to project the synthesized light onto a screen, each of said three liquid crystal display elements having first and second liquid crystal panels, each of which has a twisted nematic type liquid crystal layer or supertwisted nematic type liquid crystal layer in which the angles of twist of the liquid crystal molecules are about 180 to 270 degrees, and said device comprising:
   a plurality of signal electrodes which are parallel with each other; and
   scanning electrodes which are parallel with each other and are orthogonal to said signal electrodes, said signal electrodes and scanning electrodes being disposed for sandwiching each said liquid crystal layer therebetween and modulating the strength of light that has been transmitted through each portion of said liquid crystal layer where each of the scanning electrodes overlaps with each of the signal electrodes, wherein the rotation direction of twist of the liquid crystal molecules of the liquid crystal layer in the first liquid crystal panel is opposite to the rotation direction of twist of the liquid crystal molecules of the liquid crystal layer in the second liquid crystal panel;
   wherein the orientation of the liquid crystal molecules of a portion of the liquid crystal layer in the first panel in the vicinity of the liquid crystal layer in the second panel is orthogonal to that of a portion of the liquid crystal layer in the second panel in the vicinity of the liquid crystal layer in the first panel;
   and wherein said scanning electrodes on said first liquid crystal display panel are concentrated in half section of the first panel, and the scanning electrodes on said second liquid crystal panel are concentrated in a half section of the second crystal panel, said half section of the first crystal panel and half section of the second crystal panel being positioned in such a manner that they do not overlap with each other and wherein the signal electrodes arranged in parallel on the first liquid display panel are separated into two parts at the middle of upper half display portion, and the signal electrodes arranged in parallel on the second display panel are separated into two parts at the middle of lower half display portion; and wherein the focus of the light converging are set at a point between the first and second display panels.

* * * * *